US008385154B2

(12) United States Patent
Khan et al.

(10) Patent No.: US 8,385,154 B2

(45) Date of Patent: Feb. 26, 2013

(54) WEAPON IDENTIFICATION USING ACOUSTIC SIGNATURES ACROSS VARYING CAPTURE CONDITIONS

(75) Inventors: Saad Khan, Hamilton, NJ (US); Ajay Divakaran, Monmouth Junction, NJ (US); Harpreet Singh Sawhney, West Windsor, NJ (US)

(73) Assignee: SRI International, Menlo Park, CA (US)

( * ) Notice: Subject to any disclaimer, the term of this patent is extended or adjusted under 35 U.S.C. 154(b) by 298 days.

(21) Appl. No.: 12/766,219

(22) Filed: Apr. 23, 2010

(65) Prior Publication Data

US 2010/0271905 A1 Oct. 28, 2010

Related U.S. Application Data

(60) Provisional application No. 61/173,050, filed on Apr. 27, 2009.

(51) Int. Cl.
*G01S 3/80* (2006.01)

(52) U.S. Cl. ........................................ 367/124

(58) Field of Classification Search .................. 367/124
See application file for complete search history.

(56) References Cited

U.S. PATENT DOCUMENTS

| | | | | |
|---|---|---|---|---|
| 2006/0031057 | A1* | 2/2006 | Smith et al. | 703/22 |
| 2006/0038812 | A1* | 2/2006 | Warn et al. | 345/419 |
| 2006/0038832 | A1* | 2/2006 | Smith et al. | 345/629 |
| 2006/0256660 | A1* | 11/2006 | Berger | 367/124 |
| 2008/0021342 | A1* | 1/2008 | Echauz et al. | 600/544 |
| 2008/0045864 | A1* | 2/2008 | Candy et al. | 601/2 |
| 2008/0255839 | A1* | 10/2008 | Larri et al. | 704/238 |
| 2009/0115635 | A1* | 5/2009 | Berger et al. | 340/943 |
| 2009/0192640 | A1* | 7/2009 | Wold | 700/94 |

OTHER PUBLICATIONS

Maher, R.C, "Acoustical characterization of gunshots," IEEE SAFE 2007.

Freytag, J. C., and Brustad, B.M., "A survey of audio forensic gunshot investigations," Proc. AES 12th International Conf., Audio Forensics in the Digital Age, pp. 131-134, Jul. 2005.

Clavel, C. Ehrette, T. Richard, G., "Events Detection for an Audio-Based Surveillance System," IEEE International Conference on Multimedia and Expo, ICME 2005.

(Continued)

*Primary Examiner* — Isam Alsomiri
*Assistant Examiner* — James Hulka
(74) *Attorney, Agent, or Firm* — Moser Taboada

(57) ABSTRACT

A computer implemented method for automatically detecting and classifying acoustic signatures across a set of recording conditions is disclosed. A first acoustic signature is received. The first acoustic signature is projected into a space of a minimal set of exemplars of acoustic signature types derived from a larger set of exemplars using a wrapper method. At least one vector distance is calculated between the projected acoustic signature and each exemplar of the minimal set of exemplars. An exemplar is selected from the minimal set of exemplars having the smallest vector distance to the projected acoustic signature as a class corresponding to and classifying the first acoustic signature. The first acoustic signature and the plurality of acoustic signatures may correspond to one of gunshots, musical instruments, songs, and speech. The minimal set of exemplars may correspond to a hierarchy of acoustic signature types.

24 Claims, 7 Drawing Sheets

OTHER PUBLICATIONS

Sadler, B.M., Pham, T., and Sadler, L.C., "Optimal and wavelet-based shock wave detection and estimation," J. Acoust. Soc. Am., vol. 104(2), pt. I , pp. 955-963. Aug. 1998.

Otsuka, I., Shipman, S. and Divakaran, A., "A Video-Browsing Enabled Personal Video Recorder," in Multimedia Content Analysis: Theory and Applications, Editor Ajay Divakaran, Springer 2008.

Smaragdis, P., Radhakrishnan, R., Wilson, K., "Context Extraction through Audio Signal Analysis," in Multimedia Content Analysis: Theory and Applications, Editor Ajay Divakaran, Springer 2008.

G. H. John, R. Kohavi, and K. Pfleger, "Irrelevant features and the subset selection problem," in ICML, 1994.

* cited by examiner

Exemplar Embedding Space

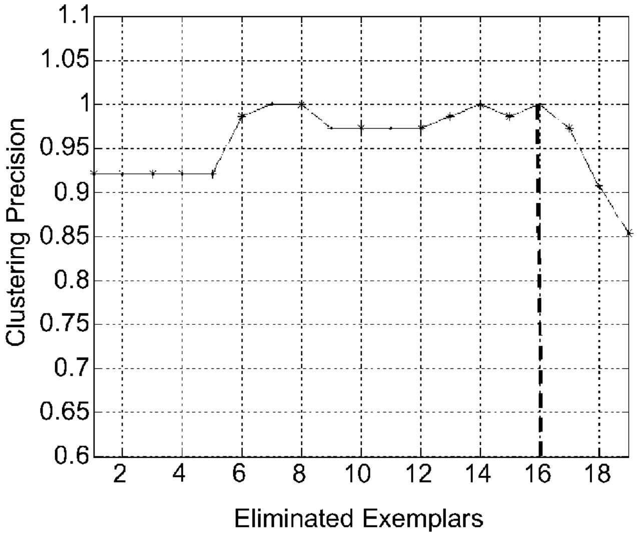
FIG. 6A
1. '45Colt_Officer _Model1'
2. '20_Gauge_Shotgun_Model1'
3. '22mm_Automatic_Model1'
4. '20_Gauge_Shotgun_Model2'
5. '9mm_Model1'
6. '9mm_Model2'
7. '357_Model1'
8. '50_Calib_Model1'
9. '22250_Model1'
10. '22mm_Automatic_Model2'
11. '762x54_Model1'
12. '9mm_Model3'
13. '357_Model2'
14. 'M1Grand_Model1'
15. '762x54r_Model2'
16. 'M1Grand_Model2
17. 'M1Grand_Model3
18. '22250_Model2'
19. '45Colt_Officers_Model2'
20. '357_Model3'
90
FIG. 6B
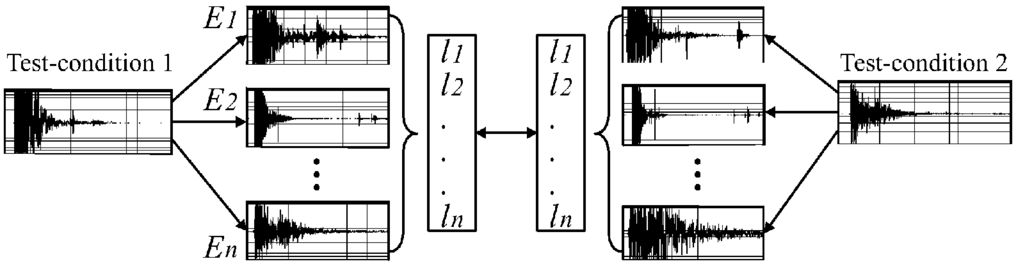
FIG. 7

WEAPON IDENTIFICATION USING ACOUSTIC SIGNATURES ACROSS VARYING CAPTURE CONDITIONS

CROSS-REFERENCE TO RELATED APPLICATIONS

This application claims the benefit of U.S. provisional patent application No. 61/173,050 filed Apr. 27, 2009, the disclosure of which is incorporated herein by reference in its entirety.

FIELD OF THE INVENTION

The present invention relates generally to acoustic pattern detection systems, and more particularly, to a method and apparatus for classifying acoustic signatures, such as a gunshot, over varying environmental and capture conditions using a minimal number of representative signature types, or exemplars.

BACKGROUND OF THE INVENTION

An accurate technique for gunshot detection can provide needed assistance to law enforcement agencies and have a positive impact on crime control. Gunshot recordings may be used for tactical detection and forensic evaluation to ascertain information about the type of firearm and ammunition employed.

Accurate gunshot detection and categorization analysis are subject to a number of significant challenges. Perhaps the most significant challenge is the effect of recording conditions on an audio signature of recorded data. Recording conditions include variations in capture conditions and factors stemming from the mechanics of a gun. For example, a muzzle blast is the primary sound emanation from sub-sonic bullets shot from a weapon, which is influenced by ammunition characteristics, gun barrel length, as well as the presence of acoustic suppressors that disguise the weapon. The mechanical action of the weapon is picked up only if a microphone is close to the weapon. For supersonic bullets, a shock wave precedes the muzzle blast and is comparably strong in signal power. As a result, even a single bullet produces pairs of sounds. Propagation through the ground or other solid surfaces becomes relevant when the recording device is close to the weapon. The speed of sound may be five times higher in solid media than in air.

A second set of challenges to effective gunshot detection and categorization analysis is lossy propagation and reflection of sound from a fired weapon. Variations in temperature, humidity, ground surfaces, and obstacles directly influence the extent of attenuation and scattering. Wind direction may affect the perceived frequency of a gunshot. These effects are not significant at a distance of 25 meters but become noticeable at a distance of 100 meters or more. Further, the angle between the gun and the microphone also plays a role, since the microphone has a directional characteristic.

A third set of challenges to effective gunshot detection and categorization analysis is effects of variability in recording devices. In Freytag, J. C., and Brustad, B. M., "A survey of audio forensic gunshot investigations," Proc. AES 12th International Conf., Audio Forensics in the Digital Age, pp. 131-134, July 2005 (hereinafter "Freytag et al."), it has been shown that the same weapon with the same ammunition yields significantly different signatures for each recording device. As pointed out in Maher, R. C, "Acoustical characterization of gunshots," IEEE SAFE 2007, gunshots are impulse-like signals and therefore the signatures are as informative of the overall capture conditions as they are of the nature of the gunshot.

Past work in audio classification has centered on classifying broad categories such as speech, music, cheering, etc., using Gaussian Mixture Models (GMM's) and Hidden Markov Models (HMM's) as described in Otsuka, I, Shipman, S and Divakaran, A., "A Video-Browsing Enabled Personal Video Recorder," in Multimedia Content Analysis: Theory and Applications, Editor Ajay Divakaran, Springer 2008, and as described in Smaragdis, P, Radhakrishnan, R, Wilson, K., "Context Extraction through Audio Signal Analysis," in Multimedia Content Analysis: Theory and Applications, Editor Ajay Divakaran, Springer 2008. Such broad classification schemes have sufficed for audio-visual event detection applications such as consumer video browsing and surveillance. However, these schemes fall short when a finer characterization of gunshots into precise weapon categories is needed. Clavel, C. Ehrette, T. Richard, G., "Events Detection for an Audio-Based Surveillance System," IEEE International Conference on Multimedia and Expo, ICME 2005, come closest to employing a fine classification scheme by detecting and classifying gunshots using a collection of subclassifiers for guns, grenades, etc. Other prior work in gunshot analysis such as is described in Freytag, J. C., and Brustad, B. M., "A survey of audio forensic gunshot investigations," Proc. AES 12th International Conf., Audio Forensics in the Digital Age, pp. 131-134, July 2005 has been based on a non-hierarchical template matching over various weapon types. The main disadvantage of non-hierarchical approaches is that they are time consuming, since characterization of a given acoustic signature requires searching an entire database of weapons. Secondly, these approaches require that acoustic capture conditions be consistent across training and testing gunshot samples. This constraint limits the applicability of weapon identification to controlled laboratory conditions or preselected environmental conditions.

Circumventing the problems described above requires a canonical space of weapon signatures that can act as a bridge between different recording conditions and that is favorable to a hierarchical course-to-fine analysis of weapon acoustic signatures (e.g., from broad categories to more detailed categories). With course-to-fine hierarchical approaches, it is not necessary to search an entire database, but only a form of a tree search, thereby constituting a dimensionality reduction approach. Unfortunately, the data driven nature of prior art dimensional/hierarchical methods such as principle component analysis (PCA) renders it difficult if not impossible to make correspondence between the dimensions in one space to another space.

It is desirable to employ a family of models trained on a suitable variety of recording devices, with a model for each recording device. If a wide enough variety of recording devices are used, at least one recording device is likely to be acceptably close to the actual recording device that captures a particular gunshot noise, and thus find a matching weapon. At the same time, it is also desirable to reduce the size of the set of recoding devices and gunshot sample recording types and conditions to be searched and compared.

Accordingly, what would be desirable, but has not yet been provided, is a system and method to automatically detect and classify firearm types across different recording conditions using a small set of exemplars (gunshot waveform types and acoustical conditions).

SUMMARY OF THE INVENTION

The above-described problems are addressed and a technical solution is achieved in the art by providing a computer implemented method for automatically detecting and classifying acoustic signatures across a set of recording conditions, comprising the steps of: receiving a first acoustic signature; projecting the first acoustic signature into a space of a minimal set of exemplars of acoustic signature types derived from a larger set of exemplars using a wrapper method; calculating at least one vector distance between the projected acoustic signature and each exemplar of the minimal set of exemplars; and selecting an exemplar from the minimal set of exemplars having the smallest vector distance to the projected acoustic signature as a class corresponding to and classifying the first acoustic signature. The minimal set of exemplars is derived by: receiving a plurality of acoustic signatures; converting each of the plurality of acoustic signatures to the discrete frequency domain having a predetermined number spectral coefficient to produce a plurality of feature vectors; training each of a plurality of classifiers using the plurality of feature vectors, wherein corresponding one of the plurality of classifiers corresponding to a predetermined acoustic signature type; selecting the plurality of trained classifiers as the larger set of exemplars; and applying the wrapper method to the trained classifiers to obtain the minimal set of exemplars. Converting each of the plurality of acoustic signatures to the discrete frequency domain may further comprise obtaining a finite set of Mel Frequency Cepstral Coefficients (MFCC) of each of the plurality of acoustic signatures. Each of the plurality of classifiers may be one of a Gaussian Mixture Model (GMM) and a support vector machine (SVM).

According to an embodiment of the present invention, The wrapper method may be a backward elimination method, comprising the steps of: (a) obtaining a distance vector between each of the plurality of feature vectors corresponding to each of the plurality of acoustic signatures and each of the plurality of trained classifiers; (b) removing one of the exemplars; (c) calculating an error measure in performance with regard to correct classification based on the obtained distance vectors to the remaining trained classifiers; (d) repeating steps (b) and (c) for a different exemplar being removed until all exemplars have been selected for removal; (e) permanently removing the exemplar which has the least effect upon performance (produces the lowest total error in steps (b) and (c)); and (f) repeating steps (b)-(e) until a minimal exemplar set having the greatest effect on performance is found. Steps (a) and (c) may further comprise the steps of clustering the plurality of feature vectors using K-means clustering and obtaining and using cluster centroids as descriptors for each acoustic signature type.

According to an embodiment of the present invention, each of the descriptors may be compared to each GMM of the plurality of trained exemplars for each acoustic signature type, wherein the exemplar producing the smallest distance is chosen as the acoustic signature type having the greatest affinity to the first acoustic signature.

According to an embodiment of the present invention, the first acoustic signature and the plurality of acoustic signatures may correspond to one of gunshots, musical instruments, songs, and speech.

According to an embodiment of the present invention, the minimal set of exemplars may correspond to a hierarchy of acoustic signature types. In one version of the hierarchical method, the steps of projecting, calculating, and selecting are performed for a coarse level of exemplars, and then repeated at a finer level of acoustic signature types within the selected course level of exemplars. In a second version of the hierarchical method, the steps of projecting, calculating, and selecting are performed for a coarse level of exemplars, and at a finer level of the hierarchy, the first acoustic signature is compared to temporal acoustic signatures corresponding to the course level of the hierarchy using correlation, wherein an acoustic signature that is the closest in distance to the first acoustic signature is selected as a sub-class corresponding to the first acoustic signature.

BRIEF DESCRIPTION OF THE DRAWINGS

The present invention will be more readily understood from the detailed description of exemplary embodiments presented below considered in conjunction with the attached drawings, of which:

FIG. 6A is a plot of clustering accuracy over a training set of exemplars for an increasing number of iterations of the wrapper method;

FIG. 6B is a listing of an initial exemplar set used in FIG. 6A;

FIG. 7 illustrates an assumption that for each different capture condition, the same gun types may be used as exemplars and new test gunshots may be embedded using the same gun type exemplars, according to an embodiment of the present invention.

It is to be understood that the attached drawings are for purposes of illustrating the concepts of the invention and may not be to scale.

DETAILED DESCRIPTION OF THE INVENTION

Embodiments of the present invention employ an exemplar embedding method that demonstrates that a relatively small number of exemplars, obtained using a wrapper function, may span an expansive space of gunshot audio signatures. By projecting/embedding a given gunshot into exemplar space, a distance measure/feature vector is obtained that describes a gunshot in terms of the exemplars. The basic hypothesis behind an exemplar embedding method is that the relationship between the set of exemplars and a space of gunshots including a testing/training set is robust to a change in recording conditions or the environment. Put another way, the embedding distance between a particular gunshot and the exemplars tends to remain the same in changing environments.

The implications of this are two-fold: unlike other dimensionality reduction methods, embodiments of the present invention have access to particular instances/examples of entities (the exemplars), which act as bridges to connect different recording conditions. Second, the embedding distances are invariant across recording conditions, i.e., an embedded vector may be used as a feature of similarity between gunshots recorded in different conditions.

According to an embodiment of the present invention, a hierarchy of gunshot classifications is employed that provides finer levels of classification by pruning out gunshot labeling that is inconsistent with a higher level type. For example, a first level of hierarchy comprises classifying gunshot recordings into broad weapons categories such as rifle, hand-gun etc. A second level of the hierarchy comprises classification into specific weapons such as a 9 mm rifle, a 357 magnum, etc. Embedding based methods according to certain embodiments of the present invention may thus be used both by itself and as a pruning stage for other search techniques.

Figure 1:
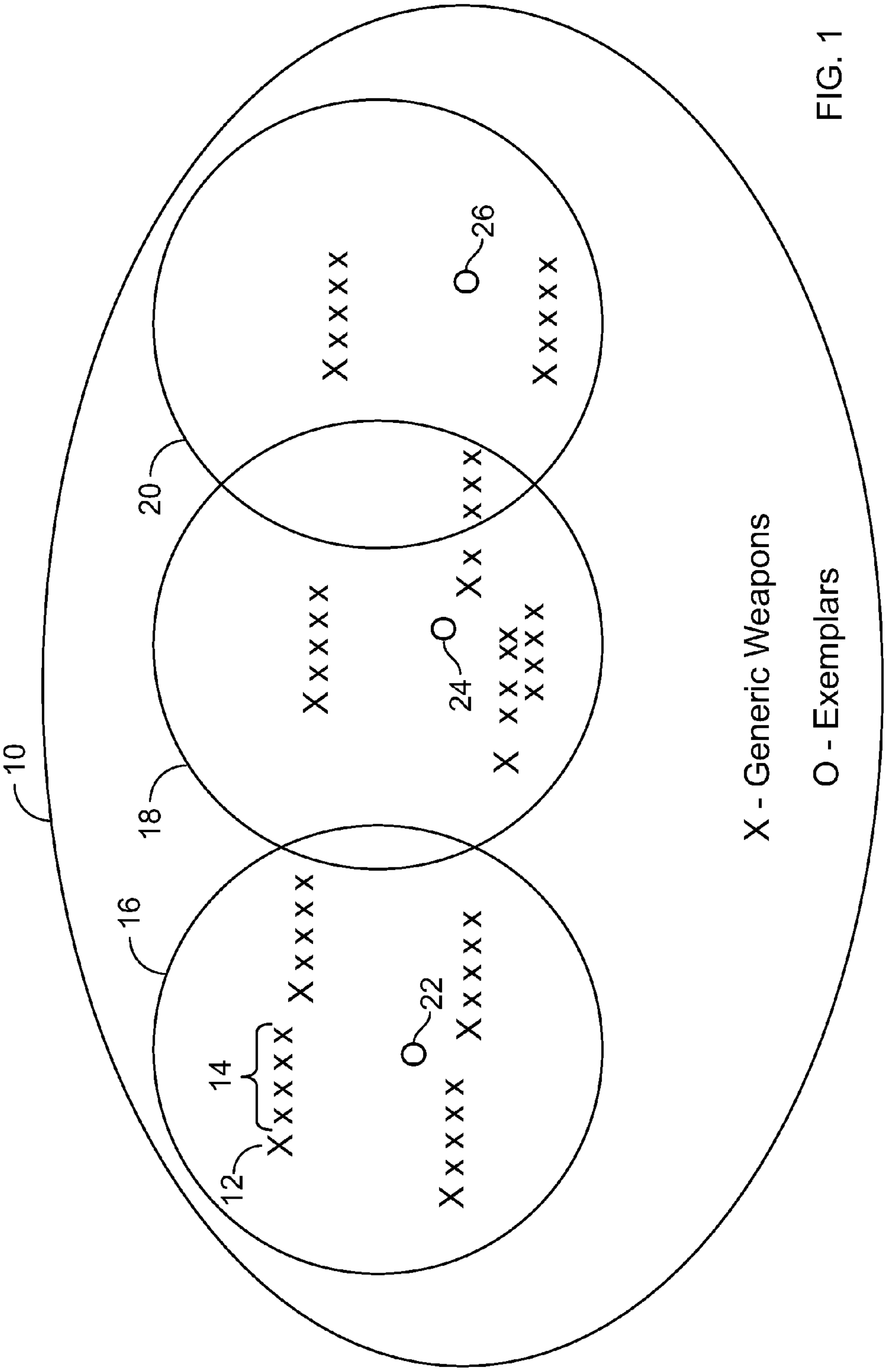
FIG. 1 is a Venn diagram illustrating a representation of a relatively large number of weapons types by a relatively few number of exemplars, according to an embodiment of the present invention.

FIG. 1 is a Venn diagram illustrating a representation of a relatively large number of weapons types by a relatively few number of exemplars. The outer oval 10 represents the entire space of weapons types. A generic weapon class 12 is represented by an upper case "X," while a specific weapon type 14 belonging to the generic weapon class 12 is represented by a lower case "x." The space of weapons types 10 is further represented by a relatively few number of smaller ovals 16, 18, 20 each designated by a single exemplar 22, 24, 26 represented as an upper case "O." Each of the ovals 16, 18, 20 span the space of classifications into "small weapons" 16, "medium weapons" 18, and "large weapons" 20. A basic assumption of the present invention is that the specific weapons types 14 at a "lower hierarchy level" and their representative generic weapons classes 12 at a higher hierarchy level each span a "distance" (not shown) in terms of a feature vector (not shown) that is "short enough" such that a respective exemplar 22, 24, 26 is still representative of the specific weapons types 14 and the generic weapon class 12 of the hierarchy.

Embodiments of the present invention further rely on training classifiers derived by using machine learning to classify weapon firings with robust features extracted from training data and actual test data. The advantage of such methods is that a wide range of operating conditions may be acquired by capturing appropriate data in realistic conditions. Complex non-linear models underlying the data may be implicitly represented in terms of the classifiers. Furthermore, certain embodiments of the present invention permit incrementally adding new weapon types as more data becomes available, as well as adding more diversity of weapon sounds for those types already in a database. Another important aspect is that similarity matching to a large database of already captured sounds may be provided for retrieving similar/same weapons from a large collection.

Note that sounds of interest discussed above are gunshots. Embodiments of the present invention are most useful in identifying and matching gunshot recordings. However, embodiments of the present invention are not limited to gunshots. In general, embodiments of the present invention are applicable to any type of transient and/or steady state live or recorded sound signature, such as sound bursts from musical instruments, speech, etc. For convenience, the following description hereinbelow will be described in terms of gunshots.

Questions that arise as a result of an exemplar-based classification scheme include the following: Which weapons types would be the best exemplars? How many weapons types should be exemplars? How does one represent a specific recording of a weapon in terms of exemplars? What would be a representative "distance" measure from an exemplar? These and other questions may be answered in the description of embodiments of the present invention presented hereinbelow.

Figure 2:
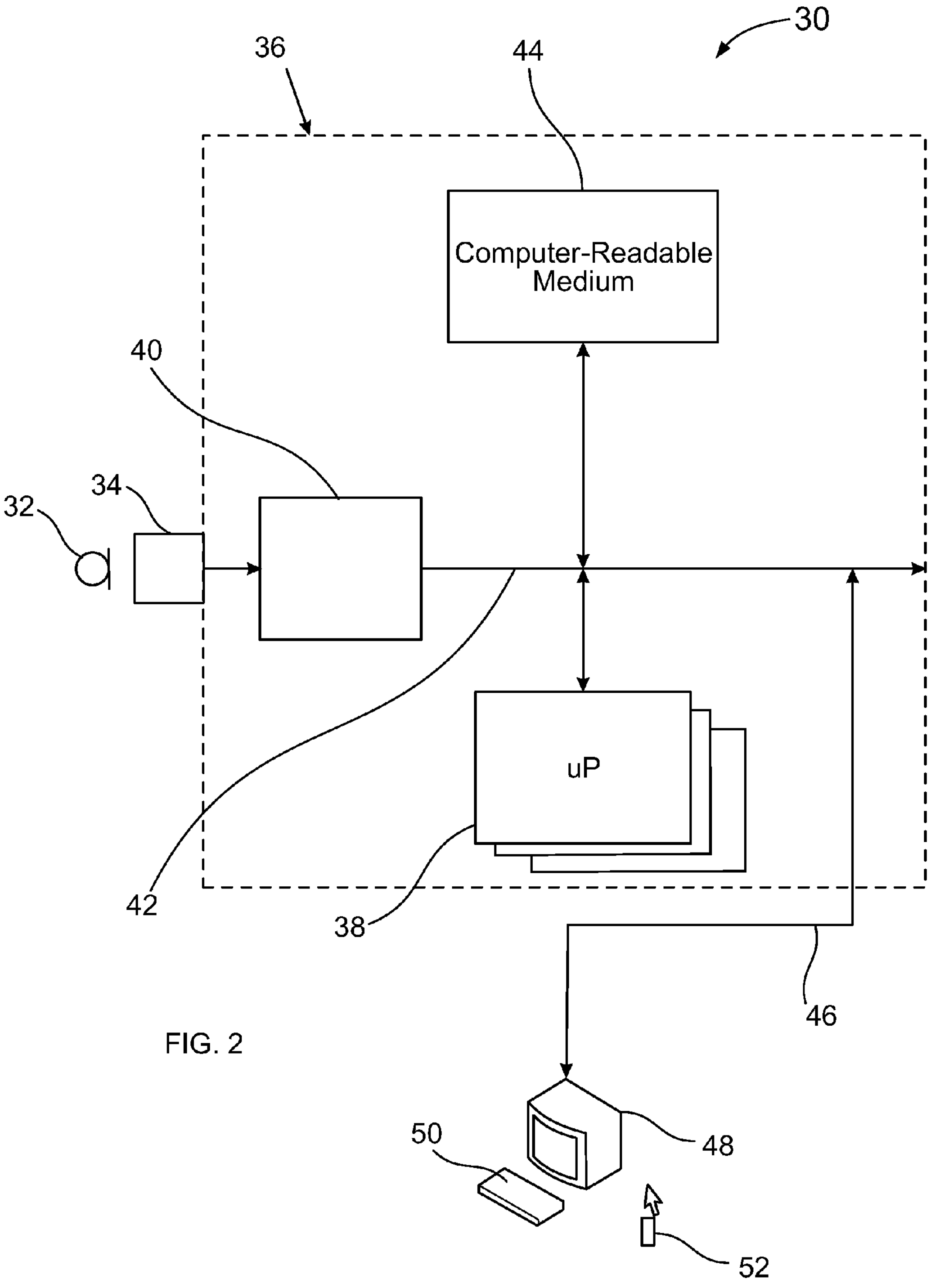
FIG. 2 is an exemplary hardware block diagram of a system for automatically detecting and classifying acoustic signatures of firearm types across different recording conditions, according to an embodiment of the present invention.

Referring now to FIG. 2, a system for automatically detecting and classifying acoustic signatures of firearm types across different recording conditions is depicted, constructed in accordance with an embodiment of the present invention, generally indicated at 30. By way of a non-limiting example, the system 30 receives digitized or analog audio from one or more audio capturing devices 32, such as one or more microphones. The system 30 may also include a digital audio capture system 34, and a computing platform 36. The digital audio capturing system 34 processes streams of digital audio, or converts analog audio to digital audio, to a form which may be processed by the computing platform 36. The digital audio capturing system 34 may be stand-alone hardware, or cards such as PCI cards which may plug-in directly to the computing platform 36. According to an embodiment of the present invention, the audio capturing devices 32 may interface with the audio capturing system 34/computing platform 36 over a heterogeneous datalink, such as a radio link and/or a digital data link (e.g., Ethernet). The computing platform 36 may include an embedded computer, a personal computer, or a work-station (e.g., a Pentium-M1.8 GHz PC-104 or higher) comprising one or more processors 38 which includes a bus system 40 which is fed by audio data streams 42 via the one or more processors 38 or directly to a computer-readable medium 44. The computer readable medium 44 may also be used for storing the instructions of the system 30 to be executed by the one or more processors 38, including an operating system, such as the Windows or the Linux operating system. The computer readable medium 44 may further be used for the storing and retrieval of audio clips of the present invention in one or more databases. The computer readable medium 44 may include a combination of volatile memory, such as RAM memory, and non-volatile memory, such as flash memory, optical disk(s), and/or hard disk(s). Portions of a processed audio data stream 46 may be stored temporarily in the computer readable medium 44 for later output to an optional monitor 48. The monitor 48 may display processed audio data stream in at least one of the time domain and the frequency domain. The monitor 48 may be equipped with a keyboard 50 and a mouse 52 for selecting audio streams of interest by an analyst.

Figure 3:
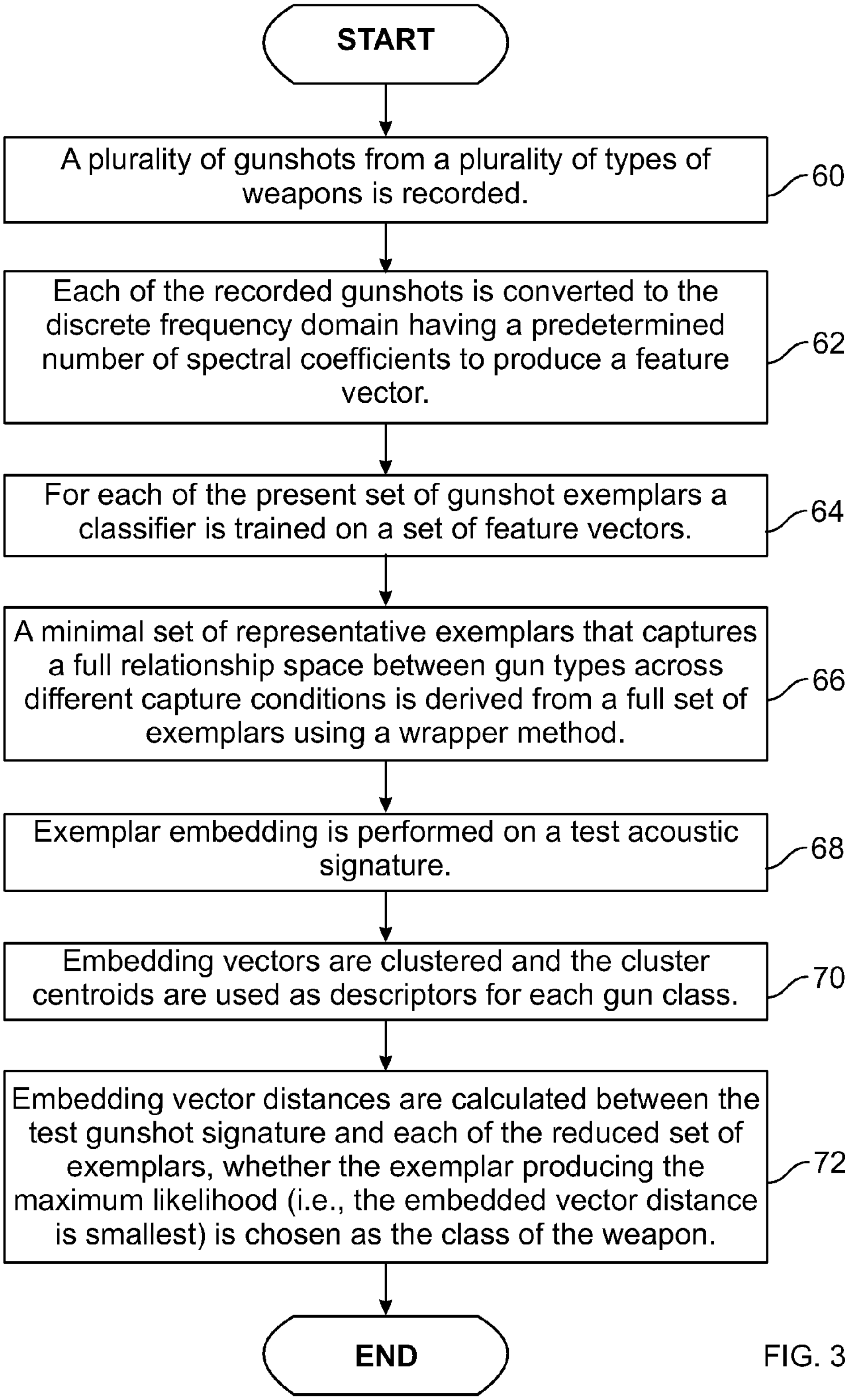
FIG. 3 is a process flow diagram illustrating exemplary steps for automatically detecting and classifying acoustic signatures of firearm types across different recording conditions, according to an embodiment of the present invention.

FIG. 3 is a process flow diagram illustrating exemplary steps for automatically detecting and classifying acoustic signatures of firearm types across different recording conditions, according to an embodiment of the present invention. In a training stage, at step 60, a plurality of gunshots from a plurality of types of weapons is recorded. At step 62, each of the recorded gunshots is converted to the discrete frequency domain having a predetermined number spectral coefficient to produce a feature vector. In a preferred embodiment, Mel Frequency Cepstral Coefficients (MFCC) are used as a frequency domain representation. Although embodiments of the present invention are described in terms of MFCCs, any finite (preferably low dimensional) spectral representation may be used.

More particularly, feature extraction may be performed using a 30 ms sliding window (10 ms overlap) over gunshot time duration as frame windows and computing 13 Mel Frequency Cepstral Coefficients (MFCCs). Expected time duration of gunshots have been empirically determined to be about 0.5 seconds based on signal-to-noise ratio (SNR). Each acoustic time frame is multiplied by a hamming window function:

$$w_i=(0.5-0.46(\cos(2\pi i/N)),\ 1\leqq i\leqq N,$$

where N is the number of samples in the window. After performing an FFT on each windowed frame, MFCCs (Mel-Frequency Cepstral Coefficients) are calculated using the following Discrete Cosine Transform:

$$C_n = \sqrt{\frac{2}{K}}\sum_{i=1}^{K}\log S_i \times \cos(n(i-1/2)\pi/K),\ n = 1, 2 \ldots L$$

where K is the number of sub bands and L is the desired length of a cepstrum. $S_i$, $1\leqq i\leqq K$, represents the filter bank energy after the passing through triangular band pass filters. The band edges for these band pass filters correspond to the Mel frequency scale (i.e., a linear scale below 1 kHz and a logarithmic scale above 1 kHz). The first thirteen coefficients resulting may be selected as a 13 dimensional feature vector associated with a given gunshot acoustic signature.

What is meant by "exemplars" in the context of a frequency domain representation is a set of representative gunshot types that have the potential to span the entire space of gunshot types in the MFCC frequency domain. In other words, it is hypothesized that each gunshot type may be represented in terms of varying degrees of affinity to the gun types in the exemplar set.

At step 64, for each of the present set of gunshot exemplars Ei, a Gaussian Mixture Model (GMM) classifier Gi is trained on a set of MFCC feature vectors obtained from a number of gunshot examples of the respective gun type (For details on GMM's and MFCC extraction, please see Otsuka, I, Shipman, S and Divakaran, A., "A Video-Browsing Enabled Personal Video Recorder," in Multimedia Content Analysis: Theory and Applications, Editor Ajay Divakaran, Springer 2008.). These act as the descriptors for each exemplar and provide a means for obtaining a degree of affinity of a newly recorded gunshot to a gunshot type (i.e., represented by the classifiers of exemplars). Although described in terms of GMMs, other classifier types may be employed, such as a support vector machine (SVM).

As described above, for each potential exemplar, a set of training examples is used to generate a GMM from MFCCs of each of the set of training samples extracted from their acoustic signatures. These GMMs serve as descriptors for each of the exemplars. Suppose there are N elements in an exemplar set. For each exemplar, Ei, a GMM descriptor Gi is learned from training examples. What results is a set of exemplar descriptors: [G1, G2, . . . , GN]. Given a sufficiently expansive set of exemplars, it may be hypothesized that the exemplar descriptor set spans the space of gunshot acoustic signatures in a domain of interest.

At step 66, a minimal set of representative exemplars that captures a full relationship space between gun types across different capture conditions is derived from a full set of exemplars using a wrapper method.

To best illustrate a general method according to an embodiment of the present invention, a more simplified method is presented that assumes that weapons are fired under similar acoustical conditions, such a gunshot fired within a reverberant room or in an open field, and that no "pruning" of the number of exemplars for comparison is performed. As a result, step 66 is temporarily "skipped."

Figure 4:
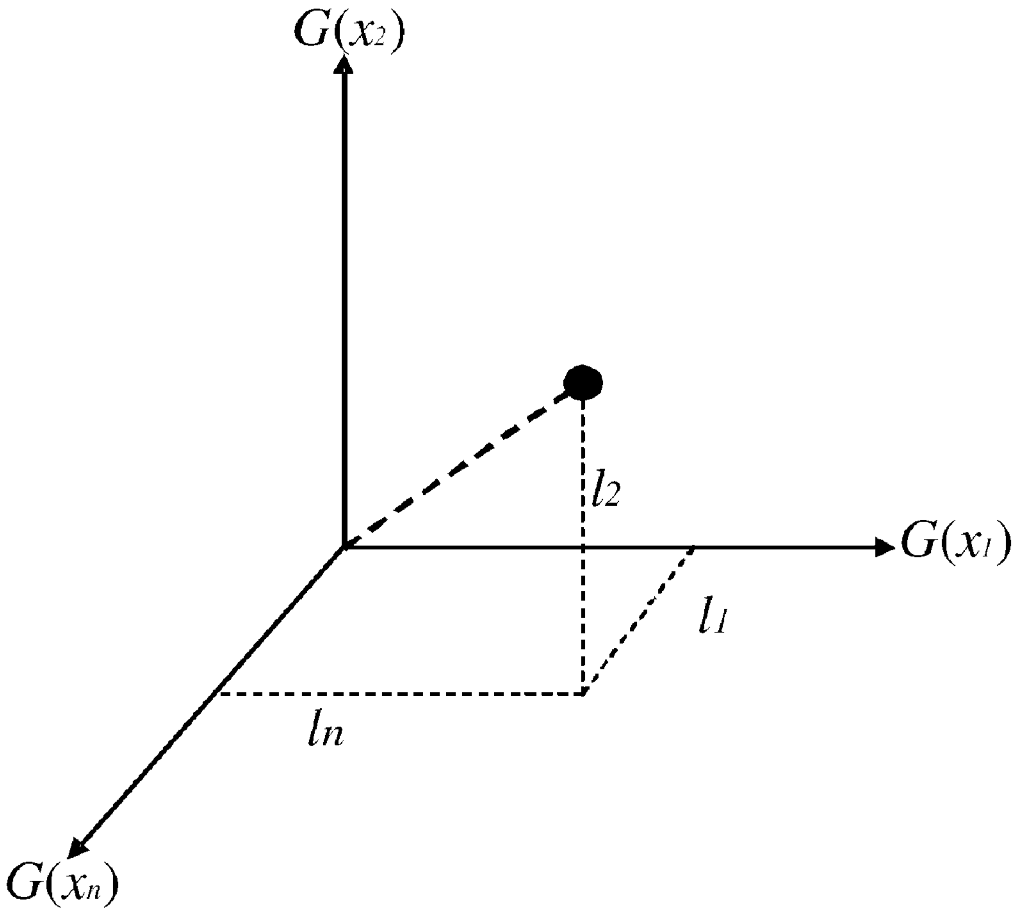
FIG. 4 is a plot showing an example of exemplar embedding, wherein a gunshot MFCC feature xi is projected into the exemplar space by obtaining the likelihood li=G(xi) for each exemplar descriptor, according to an embodiment of the present invention.

In a testing stage, at step 68, exemplar embedding is performed on a test acoustic signature, i.e., a test acoustic signature is projected into the space of exemplar descriptors. This is performed by obtaining the MFCC feature xi of a test gunshot recording and obtaining the likelihood li=G(xi) that it belongs to the exemplar descriptor Ei. The result as shown in FIG. 4 is a feature vector L=[l1, l2, . . . , lN] known as an embedding vector. Returning now to FIG. 3, at step 70, these embedding vectors are then clustered using k-means clustering and the cluster centroids of each gun type are used as descriptors for each gun class. At step 72, embedding vector distances are calculated between the test gunshot signature and each of the reduced set of exemplars. These descriptors are compared to each GMM of the set of exemplars by computing the distance of the embedding vector from each of the gunshot type cluster centroids and the exemplar producing the maximum likelihood (i.e., the embedded vector distance is smallest) is chosen as the class of weapon (i.e., the nearest exemplar).

In a more general embodiment of the present invention, it is desirable to select from the total space of exemplars a reduced set of exemplars that are most discriminative, i.e., best represents the space of gunshot types as a whole. At the same time, the chosen set of exemplars needs to work across various capture conditions. One method for handling various capture conditions is to train the same set of gunshot classifier types in various capture conditions, but it has been shown that this results in a very large exemplar set, thereby increasing computation time, while not being very discriminative, i.e., there is a high level of false positives.

A central hypothesis according to an embodiment of the present invention is that the space of gunshot acoustic signatures may be modeled as a subspace spanned by a minimal set of gunshot types (i.e., a minimal set of representative exemplars). As a result, the reduced set of exemplars still captures the correct relationships between gunshot types across different capture conditions. For example, gunshots from two different manufacturers of small handguns may map to the same exemplar, while a gunshot from a large rifle may map to a different exemplar, even if each of the gunshots has fired first in an open field and then in a reverberant room.

Given the minimal set of exemplars, a test acoustic signature may be projected or "embedded" into an exemplar subspace, thereby creating a unique descriptor that may be used for gunshot detection and gun type classification.

According to an embodiment of the present invention, and returning to training step 66, a wrapper method as described in G. H. John, R. Kohavi, and K. Pfleger, "Irrelevant features and the subset selection problem," in ICML, 1994, is employed as a technique for discriminant exemplar subset selection. The idea behind a wrapper is to use the trained classifier itself to evaluate how discriminative a candidate set of exemplars is. The wrapper performs a greedy search over the full set of exemplars where, in each iteration, classifiers are learned and evaluated for each possible subset considered. The wrapper method used is known as a backward elimination method.

Figure 5:
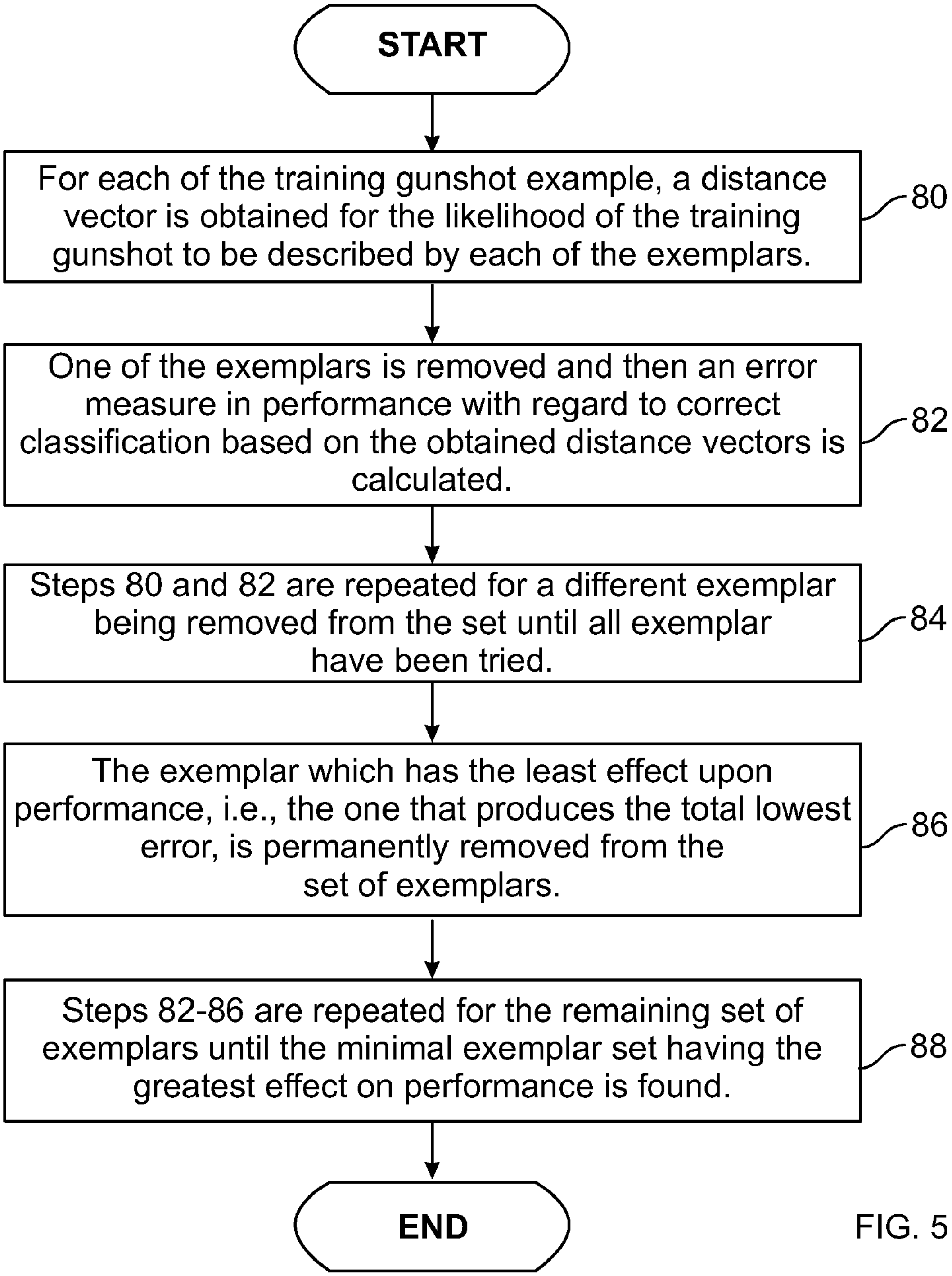
FIG. 5 is a process flow diagram illustrating exemplary steps for applying a wrapper method to obtain a reduced discriminative exemplar set, according to an embodiment of the present invention.

FIG. 5 is a process flow diagram illustrating exemplary steps for applying a wrapper method to obtain a reduced discriminative exemplar set, according to an embodiment of the present invention. At step 80, for each of the training gunshot examples, a distance vector is obtained for the likelihood of the training gunshot example to be described by each of the exemplars. At step 82, one of the exemplars is removed and then an error measure in performance with regard to correct classification based on the obtained distance vectors is calculated. At step 84, steps 80 and 82 are repeated for a different exemplar being removed from the set until all exemplars have been tried. At step 86, the exemplar which has the least effect upon performance, i.e., the one that produces the total lowest error, is permanently removed from the set of exemplars. At step 88, steps 82-86 are repeated for the remaining set of exemplars until the minimal exemplar set having the greatest effect on performance is found.

More particularly, let E denote the initial set of exemplars. Given training gunshot signatures:

1. Set X=Ø
2. Find e∈E, where k-means clustering of the training gunshot signatures using Y−y as embedding exemplars has best clustering performance.
3. Set Y=Y−y and add X=X ∪y
4. Go to step 2 and repeat till Y=Ø.

The crucial step in the above method is step 2 where a reduced exemplar set is evaluated to distinguish between a set of training gunshot examples. For each of the training gunshot examples, the embedding vector L is obtained using the exemplar set. These embedding vectors are then clustered using k-means clustering. The clusters are evaluated for their accuracy by comparison with ground truth labels. In step 2, one of the exemplars in the exemplar set is sequentially removed and the clustering accuracy of the reduced exemplar set is computed. The exemplar that has the least effect on the clustering performance is permanently removed from the exemplar set. In this fashion, at every iteration of the algorithm, the exemplar set is pruned and the best clustering performance is recorded.

FIG. 6A is a plot of clustering accuracy over a training set of exemplars for an increasing number of iterations of the wrapper method. At each iteration, the exemplar with the least impact on clustering accuracy is removed. The initial exemplar set in FIG. 6B comprises 20 different gunshot descriptors all of which were generated from multiple gunshot acoustic signatures recorded in the same environmental conditions. The training set comprises approximately 100 gunshot signatures randomly selected from different gun types in the exemplar set and separated prior to this experiment. As can be observed in FIG. 6A, as pruning of the exemplar set progresses, clustering accuracy varies. Initially, the clustering accuracy remains constant, but after 5 of the exemplars are removed from the set, the clustering accuracy improves, indicating that the original exemplar set not only had redundancy but also that the redundancy may increase the complexity of the system to a level where inference tasks like k-means or other classification approaches may be confused. From iteration 6 to 16 another plateau in clustering performance is reached. At this point, any further reduction in the exemplar set results in a monotonically decreasing training set clustering accuracy. This suggests that four remaining exemplars 90 is the minimal set of exemplars that needs to be maintained to achieve a satisfactory level of discriminatory power from the embedding vectors. Therefore, as a result of pruning using the wrapper method, a reduced set of exemplars is obtained that may be used for embedding based classification.

FIG. 7 illustrates the assumption that for each different capture condition, the same gun types may be used as exemplars and new test gunshots may be embedded using the same gun type exemplars. This allows comparison across capture conditions as the embedding vectors are in terms of the same exemplars. Using the optimum exemplar set, each new gunshot recoding received may be described as an embedding vector in the optimum exemplar space, i.e., in terms of likeliness or affinity to each of the minimal set of exemplars. This exemplar embedding vector may be used as the underlying bridge between different capture conditions. Assuming that differing environmental conditions preserves the inherent relations between the different gunshot acoustic signatures, the same optimum exemplar set may be employed across varying acoustic capture conditions. For each capture condition, a new set of descriptors may be trained for the optimum set of exemplars using gunshot examples obtained in each of the particular capture conditions. The result is a set of gunshot descriptors for each different capture condition using the same optimum set of exemplars. As a result, embedding vectors obtained from different capture conditions may communicate and interact in a single embedding space.

Experimental results have been obtained for automatically detecting and classifying firearm types across different recording conditions using a small set of exemplars. To generate an exemplar set, a pool of 20 different gunshots types were recorded under the same capture conditions (outdoors approx 10 m from a source). The weapons types included a variety of rifles and handguns such as a 45Colt, 9 mm, 50 Caliber, 20 Gauge Shotgun, etc. (see FIG. 6B for details). For training and testing, a separate pool of gunshots including between 5 to 15 samples of each gun type was used. The training set was used in the exemplar selection algorithm to obtain a reduced set of 4 exemplars: M1Grand (rifle), 22250 (rifle), 45Colt (handgun) and 357 (handgun). The training set was also used to obtain cluster centers for each gun type in the exemplar embedding space.

To test performance across recording conditions, different capture conditions were simulated, including: “Room Reverb,” “Concert Reverb,” and “Doppler Effect”. Each of the exemplar and test gunshot sample was modified with an appropriate modulation. Exemplar embedding was performed in the respective capture conditions and embedding vectors were compared across conditions. A true classification was marked as one in which a test gunshot sample from a different capture condition was classified or matched to the correct gun type class cluster under the original capture conditions. Table 1 shows resulting performance using the method of the present invention. Note that “In First 2”, “In First 3” means the correct classification is amongst the two and three closest clusters respectively, whereas “First” means the correct classification is also the closest cluster.

TABLE 1

Classification accuracy for embedding based approach for different capture conditions.

| | Room Reverb | Concert Reverb | Doppler |
|---|---|---|---|
| In First 3 | 0.99 | 0.93 | 0.71 |
| In First 2 | 0.83 | 0.75 | 0.51 |
| First | 0.69 | 0.6 | 0.41 |
| Handgun/Rifle | 1 | 0.97 | 0.96 |

The method of the present invention was also tested on a reduced number of classes. Instead of all 20 gunshot types, the testing set was divided into two classes: Rifle and Handgun. As can be seen in Table 1, classification accuracy improves with a reduced number of classes. This suggests a hierarchy of gunshot classifications that may improve finer level classification by pruning out gunshot labeling that is inconsistent with its higher level type. The embedding based method of the present invention may thus be used both by itself and as a pruning stage for other search techniques.

Figure 8:
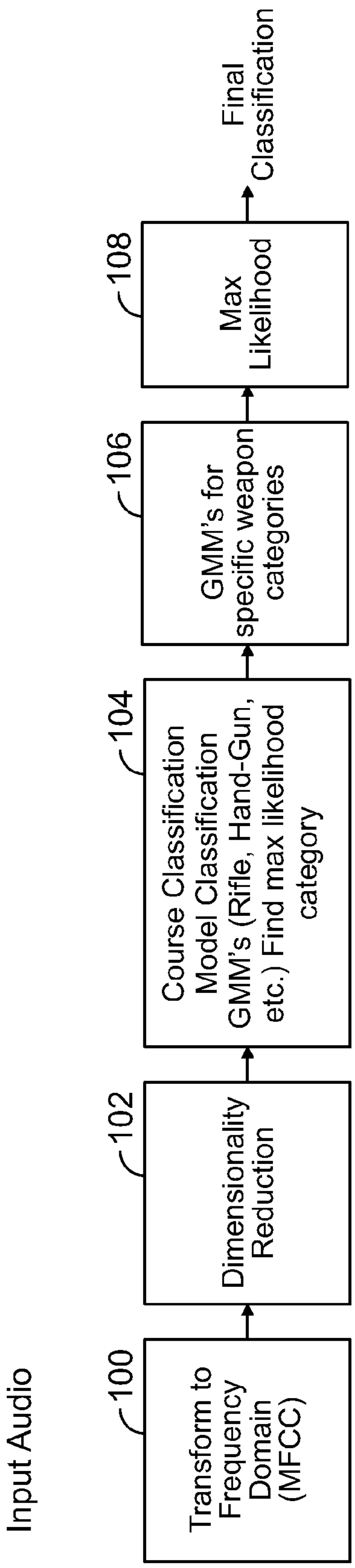
FIG. 8 is a block diagram illustrating a method for classifying gunshots employing a classification hierarchy, according to an embodiment of the preset invention.

FIG. 8 is a block diagram illustrating a method for classifying gunshots employing a classification hierarchy, according to an embodiment of the present invention. A first set of gunshot types, such as from a rifle or handgun, may serve as a coarse level of the hierarchy, while a second set of types, such as a 357 Magnum and 45colt for a handgun sub-class, and a 22 mm rifle and sawed off-shotgun for the subset of the rifle class, may serve as a fine level of the hierarchy. At step 100, a text gunshot signal is received and transformed to the frequency domain using an MFCC. At step 102, dimensional reduction is performed on the MFCC by projecting the MFCC to a feature vector in the space of the course classification model of GMMs of the coarse level exemplars. At step 104, the nearest exemplar based on the distance to the feature vectors is chosen as the exemplar class that produces the maximum likelihood of successful classification. At step 106, the feature vector distances are further computed for the GMMs for the specific weapons categories. At step 108, the nearest exemplar based on the distance to the feature vectors is chosen as the exemplar class that produces the maximum likelihood of successful classification.

In a variation of the method of FIG. 8 for classifying gunshots employing a classification hierarchy, exemplar embedding is employed at a course level of the hierarchy to restrict the scope of the search and to roughly locate the acoustic signature of the gunshot in weapon space. At a fine level of the hierarchy, direct matching of the acoustic signature in the time domain rather than the frequency domain is employed. The time domain acoustic signature of a query gunshot is compared directly to all acoustic signatures stored in a database corresponding to gunshot types for the course level of the hierarchy found by exemplar embedding. Direct matching is based on correlation of the query gunshot in the temporal domain with a gunshot in the database. The query gunshot is matched against all the entries in the database corresponding to the course level of the hierarchy and the closest in distance as measured with correlation is selected.

In addition to classifying known weapons under either the same conditions or different conditions, certain embodiments of the present invention are applicable to the case of comparing two unknown weapons to each other. For example, if a first unknown weapon maps to a handgun, and a second unknown weapon also maps to a handgun, then it may be inferred that, even though the exact handgun type is unknown, the two unknown gunshots may be said to originate from the same gun types. Thus, weapons may be matched. According to another embodiment of the present invention, one can infer under what conditions a gunshot was fired. This may be achieved by training each set of classifiers under different conditions, and running the unknown gun with unknown conditions through each classifier/condition type. The conditions associated with the GMM that produces the maximum likelihood (nearest embedded vector) is indicative of the conditions under which the unknown gunshot was fired. Still further, the types and conditions for acoustic signatures of instrument of unknown type or entire songs may be input to produce matches between pairs of instruments or songs, etc.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A computer implemented method for automatically detecting and classifying acoustic signatures across a set of recording conditions, comprising the steps of:

projecting a first acoustic signature, initially received from or captured by an audio sensor, into a vector space of a minimal set of exemplars of acoustic signature types derived from a larger set of exemplars using a wrapper method to obtain an embedding vector;

calculating at least one vector distance between the embedding vector of the projected acoustic signature and each exemplar of the minimal set of exemplars; and selecting an exemplar from the minimal set of exemplars having the smallest vector distance to the embedding vector of the projected acoustic signature as a class corresponding to and classifying the first acoustic signature.

2. The method of claim 1, wherein the minimal set of exemplars is derived by:

receiving a plurality of acoustic signatures;

converting each of the plurality of acoustic signatures to the discrete frequency domain having a predetermined number spectral coefficient to produce a plurality of feature vectors;

training each of a plurality of classifiers using the plurality of feature vectors, wherein one of the plurality of classifiers corresponds to a predetermined acoustic signature type;

selecting the plurality of trained classifiers as the larger set of exemplars; and applying the wrapper method to the trained classifiers to obtain the minimal set of exemplars.

3. The method of claim 2, wherein the step of converting each of the plurality of acoustic signatures to the discrete frequency domain further comprises the step of obtaining a finite set of Mel Frequency Cepstral Coefficients (MFCC) of each of the plurality of acoustic signatures.

4. The method of claim 2, wherein each of the plurality of classifiers is one of a Gaussian Mixture Model (GMM) and a support vector machine (SVM).

5. The method of claim 2, wherein the wrapper method is a backward elimination method.

6. The method of claim 5, wherein the backward elimination method comprises the steps of:

(a) obtaining a distance vector between each of the plurality of feature vectors corresponding to each of the plurality of acoustic signatures and each of the plurality of trained classifiers;

(b) removing one of the exemplars;

(c) calculating an error measure in performance with regard to correct classification based on the obtained distance vectors to the remaining trained classifiers;

(d) repeating steps (b) and (c) for a different exemplar being removed until all exemplars have been selected for removal;

(e) permanently removing the exemplar which has the least effect upon performance (produces the lowest total error in steps (b) and (c)); and (f) repeating steps (b)-(e) until a minimal exemplar set having the greatest effect on performance is found.

7. The method of claim 6, wherein steps (a) and (c) further comprises the steps of:

clustering the plurality of feature vectors using K-means clustering and obtaining and using cluster centroids as descriptors for each acoustic signature type.

8. The method of claim 7, further comprising the step of comparing each of the descriptors to each GMM of the plurality of trained exemplars for each acoustic signature type, wherein the exemplar producing the smallest distance is chosen as the acoustic signature type having the greatest affinity to the first acoustic signature.

9. The method of claim 1, wherein the first acoustic signature and the plurality of acoustic signatures correspond to one of gunshots, musical instruments, songs, and speech.

10. The method of claim 1, wherein the minimal set of exemplars correspond to a hierarchy of acoustic signature types.

11. The method of claim 10, wherein the steps of projecting, calculating, and selecting are performed for a coarse level of exemplars, and then repeated at a finer level of acoustic signature types within the selected course level of exemplars.

12. The method of claim 10, wherein the steps of projecting, calculating, and selecting are performed for a coarse level of exemplars, and at a finer level of the hierarchy, the first acoustic signature is compared to temporal acoustic signatures corresponding to the course level of the hierarchy in a database using correlation, wherein an acoustic signature that is the closest in distance to the first acoustic signature is selected as a sub-class corresponding to the first acoustic signature.

13. An apparatus for automatically detecting and classifying acoustic signatures across a set of recording conditions, comprising:

at least one processor configured for:

projecting a first acoustic signature, initially received from or captured by an audio sensor, into a vector space of a minimal set of exemplars of acoustic signature types derived from a larger set of exemplars using a wrapper method to obtain an embedding vector;

calculating at least one vector distance between the embedding vector of the projected acoustic signature and each exemplar of the minimal set of exemplars; and selecting an exemplar from the minimal set of exemplars having the smallest vector distance to the embedding vector of the projected acoustic signature projected acoustic signature as a class corresponding to and classifying the first acoustic signature.

14. The system of claim 13, wherein the minimal set of exemplars is derived by:

receiving a plurality of acoustic signatures;

converting each of the plurality of acoustic signatures to the discrete frequency domain having a predetermined number spectral coefficient to produce a plurality of feature vectors;

training each of a plurality of classifiers using the plurality of feature vectors, wherein a corresponding one of the plurality of classifiers corresponds to a predetermined acoustic signature type;

selecting the plurality of trained classifiers as the larger set of exemplars; and applying the wrapper method to the trained classifiers to obtain the minimal set of exemplars.

15. The system of claim 14, wherein each of the plurality of classifiers is one of a Gaussian Mixture Model (GMM) and a support vector machine (SVM).

16. The system of claim 14, wherein the wrapper method is a backward elimination method, comprising:

(a) obtaining a distance vector between each of the plurality of feature vectors corresponding to each of the plurality of acoustic signatures and each of the plurality of trained classifiers;

(b) removing one of the exemplars;

(c) calculating an error measure in performance with regard to correct classification based on the obtained distance vectors to the remaining trained classifiers;

(d) repeating steps (b) and (c) for a different exemplar being removed until all exemplars have been selected for removal;

(e) permanently removing the exemplar which has the least effect upon performance (produces the lowest total error in steps (b) and (c)); and (f) repeating steps (b)-(e) until a minimal exemplar set having the greatest effect on performance is found.

17. The system of claim 13, wherein the first acoustic signature and the plurality of acoustic signatures correspond to one of gunshots, musical instruments, songs, and speech.

18. The system of claim 13, wherein the minimal set of exemplars correspond to a hierarchy of acoustic signature types.

19. A non-transitory computer-readable medium for storing computer instructions for automatically detecting and classifying acoustic signatures across a set of recording conditions that, when executed on a computer, enable a processor-based system to:

project a first acoustic signature, initially received from or captured by an audio sensor, into a vector space of a minimal set of exemplars of acoustic signature types derived from a larger set of exemplars using a wrapper method to obtain an embedding vector;

calculate at least one vector distance between the embedding vector of the projected acoustic signature and each exemplar of the minimal set of exemplars; and select an exemplar from the minimal set of exemplars having the smallest vector distance to the embedding vector of the projected acoustic signature as a class corresponding to and classifying the first acoustic signature.

20. The computer-readable medium of claim 19, wherein the minimal set of exemplars is derived by:

receiving a plurality of acoustic signatures;

converting each of the plurality of acoustic signatures to the discrete frequency domain having a predetermined number spectral coefficient to produce a plurality of feature vectors;

training each of a plurality of classifiers using the plurality of feature vectors, wherein a corresponding one of the plurality of classifiers corresponds to a predetermined acoustic signature type;

selecting the plurality of trained classifiers as the larger set of exemplars; and applying the wrapper method to the trained classifiers to obtain the minimal set of exemplars.

21. The computer-readable medium of claim 20, wherein each of the plurality of classifiers is one of a Gaussian Mixture Model (GMM) and a support vector machine (SVM).

22. The computer-readable medium of claim 20, wherein the wrapper method is a backward elimination method, comprising:

(a) obtaining a distance vector between each of the plurality of feature vectors corresponding to each of the plurality of acoustic signatures and each of the plurality of trained classifiers;

(b) removing one of the exemplars;

(c) calculating an error measure in performance with regard to correct classification based on the obtained distance vectors to the remaining trained classifiers;

(d) repeating steps (b) and (c) for a different exemplar being removed until all exemplars have been selected for removal;

(e) permanently removing the exemplar which has the least effect upon performance (produces the lowest total error in steps (b) and (c)); and (f) repeating steps (b)-(e) until a minimal exemplar set having the greatest effect on performance is found.

23. The computer-readable medium of claim 19, wherein the first acoustic signature and the plurality of acoustic signatures correspond to one of gunshots, musical instruments, songs, and speech.

24. The computer-readable medium of claim 19, wherein the minimal set of exemplars correspond to a hierarchy of acoustic signature types.

* * * * *